UNITED STATES PATENT OFFICE.

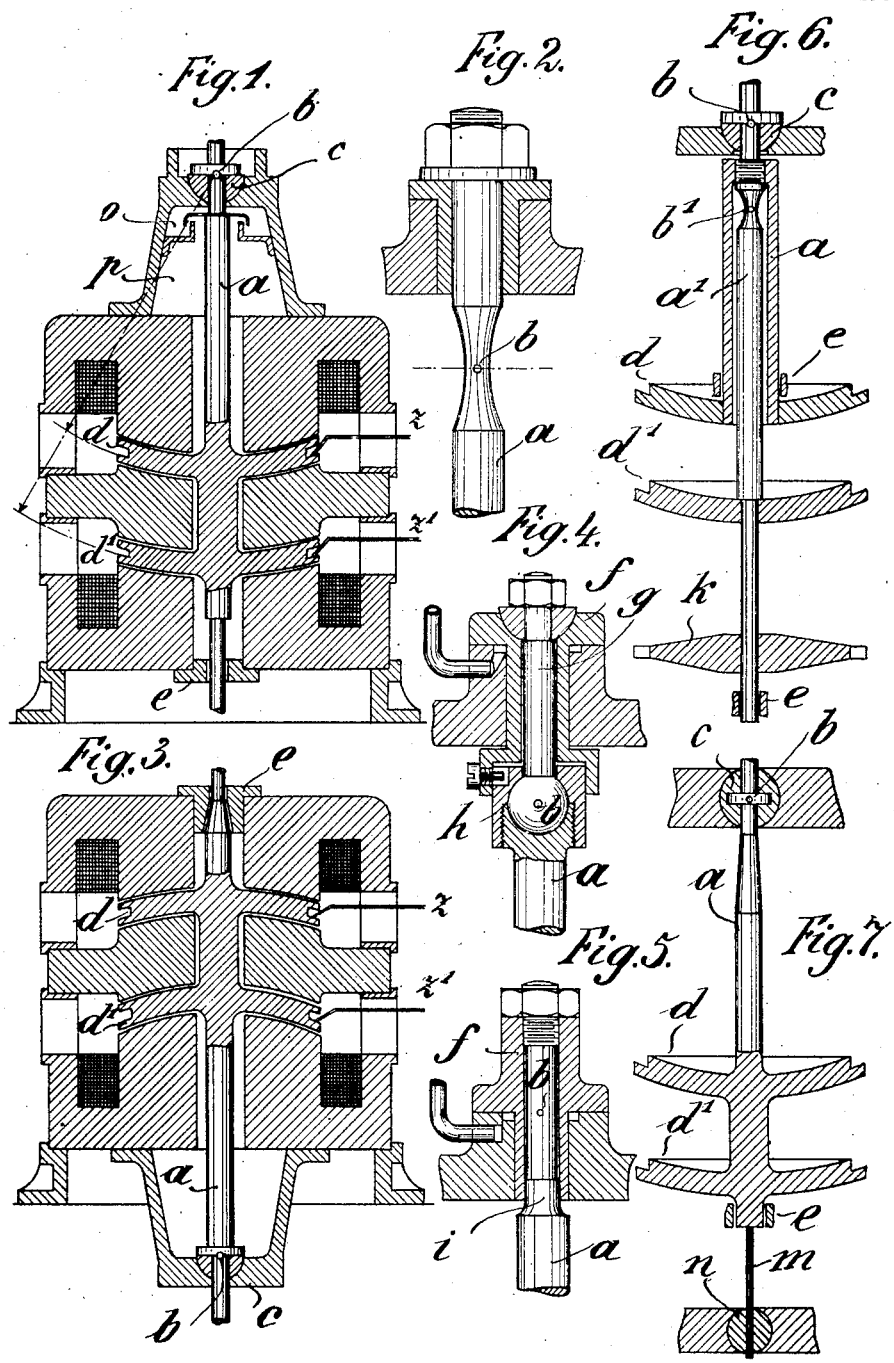

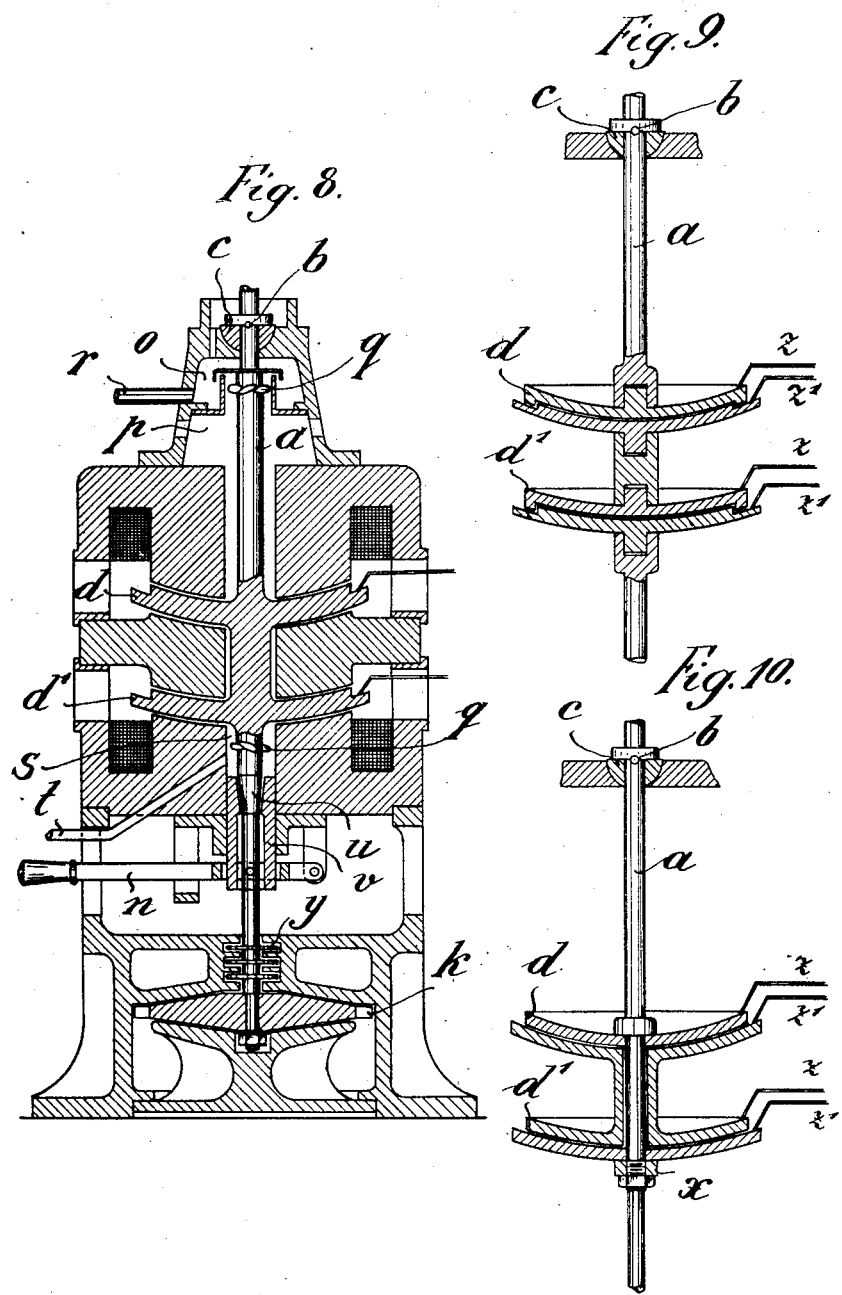

WILHELM MATHIESEN, OF LEUTZSCH-LEIPZIG, GERMANY.

UNIPOLAR DYNAMO.

No. 861,192.   Specification of Letters Patent.   Patented July 23, 1907.

Application filed January 25, 1907. Serial No. 354,162.

*To all whom it may concern:*

Be it known that I, WILHELM MATHIESEN, manufacturer, a subject of the German Emperor, and residing at Leutzsch-Leipzig, in the Kingdom of Saxony and German Empire, have invented certain new and useful Improvements in and Relating to Unipolar Dynamos, of which the following is a specification.

For the purpose of generating electro-motive forces such as are required for ordinary lighting work and power distribution uni-polar dynamos with few armature elements must be run at high speed. The greater the number of revolutions per minute, the fewer armature elements and brushes are required for producing any given electro-motive force, and since the efficiency of the machine is largely dependent on the number of brushes used, it is proportional to the speed at which the machine can be run.

To avoid injurious effects from unbalanced centrifugal forces in a dynamo run at very high speed, it is, however, essential to use a shaft or armature-spindle which adjusts itself, with the armature, according to the center of gyration, as is the case with elastic shafts. A shaft possessing elasticity in its entire length between bearings, as used for example in the De Laval turbine, has the disadvantage, when used for carrying a dynamo-armature, that magnetic attraction may drag the armature aside and cause it to adhere to a pole-face. The entire length of the shaft, or practically the entire length, should therefore be sufficiently rigid to prevent displacement of the armature by magnetic attraction. A wholly elastic shaft has, moreover, the disadvantage that the armature fixed thereto tends to move into its normal plane of gravitational equilibrium, unless that plane coincides with its geometrical plane, and this may cause the armature to swerve. Such swerving renders it impossible, or at least very difficult, to take current from the armature. The circumferential surfaces of the armature, which must necessarily swerve unless there is accidental coincidence of the geometrical plane with the plane of equilibrium, are in that case unavailable for the delivery of current, so that the lateral surfaces must be used for that purpose. These surfaces only run parallel if the freely suspended part of the shaft is inflexible, so the only shaft suitable for an armature driven at very high speed is one which is capable of oscillating about a fixed center.

Dynamos have been constructed with rigid shafts capable of oscillation, such shafts being journaled at one end in bearings which yield to the eccentric movements of the armature. For this purpose a movable bearing has, for example, been used in conjunction with a guide-bearing provided with springs, india-rubber cushions or the like. A movable bearing of this kind rocks or oscillates in accordance with the oscillations of the armature, and if this takes place, say, 10,000 times per minute the friction at the bearing renders the latter very hot, so that on the one hand a considerable amount of energy is dissipated and on the other hand the working of the machine is interfered with by the resistance opposed to the tendency of the shaft to seek equilibrium.

The oscillation of a non-rotating body, such as a yielding bearing, produces so much friction that only a comparatively low speed is practicable therewith, this being due to the centrifugal forces and the forces which tend to retain the bearing in its normal position. To compensate or balance the oscillations of the armature it has also been proposed to freely suspend the entire machine, so that the field-magnet oscillates with the armature. This arrangement has disadvantages similar to those of yielding bearings. It has also been proposed to use an elastic shaft in conjunction with a yielding bearing, but this arrangement is entirely unsuitable for a uni-polar machine with an iron disk-armature, since the shaft is incapable of preventing the swerving of the armature. Moreover the arrangement has the disadvantage that the bearing oscillates and causes energy to be dissipated by friction. These known constructions are not adapted to secure absence of vibration in dynamos run at very high speeds: such absence of vibration can only be secured by using, in conjunction with a disk-armature a shaft adapted to oscillate about a fixed center. Arrangements of this kind are illustrated in the annexed drawing, in which Figure 1 is a section of a uni-polar machine with a shaft $a$ and means adapting it to oscillate about the center $b$ of the hemi-spherical or universal-joint bearing $c$, so that the shaft with the armature-parts $d$, $d^1$, can adjust itself in equilibrium, the cone guide $e$ serving to prevent the swerving of the free end of the shaft.

Fig. 2 represents a portion of an armature shaft $a$ journaled in a fixed bearing but having a reduced part or neck, the center $b$ of which is a center of motion. This neck allows of slight deflection of the shaft but does not permit of the latter being bent, so that the armature cannot be dragged aside by magnetic forces; the resistance opposed by the shaft to these forces increases with the distance between the armature and the neck. With a shaft having a ball-joint or flexible neck it might in some cases occur that the adjustment of the shaft in equilibrium would cause the lateral surfaces of the armature to swerve, and the play allowed to the shaft by the guide $e$ might allow the edge of the armature to approach and touch the pole-faces at one side. To prevent this, the machines illustrated in the annexed drawing are so constructed that the lateral surfaces of the armature, and the pole-faces adjacent thereto, form segments of spheres the common center of which is at the center about which the shaft oscillates. With this construction the armature disks may swerve considerably at their circumferences without causing their lateral surfaces to touch the pole-faces, and considerable play may be allowed to the shaft in the guide $e$ without such a contact taking place. The said spherical surfaces are, moreover, very well adapted for the application of the brushes. If the contact-surfaces of the brushes are flat planes perpendicular to the axis of the shaft, the oscillation of the latter may cause the said surfaces to jar slightly, and this would be injurious with the high speeds used. To overcome the effect of this jarring it would be necessary to press the brushes down tightly on the armature, but in that case the friction would become too great. The spherical shape of the armature-disks and brush-surfaces is, therefore, of great importance in securing absence of sparking with slight pressure of the brushes. A contact-surface which lies approximately in the spherical path of the shaft is also adapted to secure to a greater or less degree the advantage indicated. For facility of construction the contact-surface may for example be flat and tangential to the sphere. The two armatures $d\ d^1$ are provided with grooves for the brushes $z\ z^1$, the contact-surfaces of the said grooves being likewise segments of spheres having their center at the point $b$. These grooves have the advantage that the radius of friction with the brushes is small and that the access of oil to the contact surfaces is prevented. If a centrifugal lubricator is used, oil is liable to be thrown on to the armature and would of course greatly interfere with the contact of the brushes if the contact-surfaces were external. If, however, the contact-surfaces are in grooves, or within the outer rim of the armature, the access of oil thereto is prevented, since the armature itself tends to eject the oil by centrifugal force.

Fig. 3 illustrates the arrangement of a vertical shaft with the universal joint $c$ at its lower end, but it is preferable to suspend the shaft from the said joint in view of the stable equilibrium secured thereby. Instead of the ball and socket joint and flexible neck illustrated, other arrangements can be used to enable the shaft to oscillate about a fixed center.

In the construction shown in Fig. 4, for example, the shaft $a$ is suspended from a rod $g$ having at each end a ball and socket joint and serving to connect the shaft $a$ to the revolving sleeve $f$. The socket $h$ of the lower ball-joint is fixed to the shaft $a$ and to a circular flange of the sleeve $f$, the dimensions of the parts being such as to allow of a certain amount of oscillation of the shaft $a$.

In the construction illustrated in Fig. 5 the shaft $a$ has a reduced neck of special length, the upper end of this neck being rigidly fixed to the revoluble sleeve $f$, and the lower end $i$ being slightly enlarged, with concave circumference, to make contact with the said sleeve, so that the neck allows of a slight amount of oscillation of the shaft about the center $b$. Any device equivalent or similar to a universal joint can be used instead of a ball and socket joint for the purpose indicated.

Instead of a single oscillating shaft two such shafts may be used in conjunction, as shown in Fig. 6, one of the said shafts being located within the other. The two armature parts $d\ d^1$ are electrically connected to each other and the inner shaft $a^1$ carries, in addition to the disk $d^1$, the turbine-wheel $k$. The shafts oscillate independently about the centers $b$ and $b^1$ respectively.

Instead of using an oscillating shaft with a loose end, the shaft may have an elastic extension, as shown in Fig. 7. In this construction the upper end of the shaft is supported by a ball and socket-joint $c$, and the lower end, which works in a loose guide $e$, is provided with an elastic extension $m$ connected to a ball and socket joint $n$. When the dynamo is started the guide $e$ at first prevents deflection of the shaft, but when the latter has acquired a high speed and has adjusted itself according to the laws of gyration the guide is no longer required, since the elastic member then prevents deflection. This construction also has the advantage that it allows of placing the shaft horizontally, which may be of advantage if the dynamo is driven by a steam-turbine. It has been found that the centrifugal forces due to the rapid rotation of the shaft in part convert the oil into a vapor or spray, which passes from the chamber $o$ (Fig. 1) into the chamber $p$, from which it is sucked by the disk $k$; this vapor is in part condensed on the walls surrounding the armature, and may saturate the insulation of the magnet coils, and combine with dust to coat and clog the brushes. To obviate these disadvantages, means may be provided for removing the oil spray from the machine by suction or the like. Any suitable suction-device may be used for this purpose. A pump used for this purpose, directly connected to the oscillating shaft, is shown in Fig. 8, in which the vanes $q$ suck air from the chamber $p$ and force it through the chamber $o$ and tube $r$ in order to remove the spray. No centrifugal lubricator is shown at the lower part of the shaft, above the guide, but a small amount of spray may enter the space $s$, so that vanes $q$ may be desirable in the latter, to propel air and spray through the tube $t$.

In the construction shown in Fig. 8 the guide at the lower end of the shaft is adapted to be adjusted by hand while the machine is running. For this purpose the shaft $a$ is coned at $u$, the coned part being located within an axially movable sleeve or box $v$. The latter is vertically adjustable by means of a hand-lever $n$, so that the amount of play allowed to the shaft can be regulated according to the eccentricity of the oscillation and the quantity and consistency of the oil supplied. The adjustment of the lever or box may be retained by fitting the box or sleeve $v$ tightly into the part in which it slides, or by any other suitable means. I do not limit myself to this arrangement for obtaining relative axial movement between the coned part of the shaft and the box or sleeve surrounding it, as any equivalent means may be employed for this purpose.

In each of the examples so far described, only two armature disks are used, but to generate higher electromotive forces, four or more disks may be used.

Fig. 9 illustrates a construction in which four disks are used, each of the armatures $d\ d'$ consisting of two adjacent disks, one of which has a cylindrical extension intersecting the plane of the other disk, at the circumference. The overlapping circumferential part of one disk, with the insulating material, is interlocked with the circumferential part of the other disk by pressing the disks together, for instance, by means of hydraulic pressure, or by heating the disk with the overlapping cylindrical extension and permitting it to shrink into binding contact with the other disk, on cooling, in order to produce the interlocking effect between the disks. This arrangement allows of using disks without axial perforation, and the maximum torsion which may be applied to a shaft with disks so united is nearly as great as the torsion resisted by a single length of shafting on which two disks are separately keyed.

Fig. 10 illustrates a shaft with two axially perforated double-armatures $d$ $d^1$, the latter comprising in the aggregate two outer members and a central member common to both. The armature-parts are assembled by means of a collar and a nut $x$. The oscillating shaft can be driven from above or below by means of a steam-turbine and any suitable connecting means. The turbine wheel may, for example, be fixed to a prolongation of the shaft, as shown in Fig. 8, in which $k$ is the turbine. In this case the turbine has no shaft-bearings, but the joint where the shaft enters its casing is made tight by means of suitable packing, as for example at $y$. I do not limit myself to this means of establishing driving connection between the turbine and the dynamo; I may employ any suitable connection which will not defeat the self-adjusting action of the oscillatory armature shaft.

It is obvious that a uni-polar dynamo constructed as described can be used for galvano-plastic and metallurgical work as well as for lighting work and power distribution.

What I claim as my invention and desire to secure by United States Letters Patent is:

1. A uni-polar electrical machine comprising a shaft, a universal-joint bearing through which said shaft is mounted and by which it is permitted to oscillate, a disk armature mounted on said shaft at a point remote from the universal joint bearing, and magnetic poles adjacent to the armature: the said armature and poles being provided with spherical faces whose plane lies transverse to the shaft whose common center coincides substantially with the center of oscillation of the shaft.

2. A uni-polar electrical machine comprising a shaft, a universal-joint bearing through which said shaft is mounted and by which it is permitted to oscillate during its rotation, a disk armature mounted on said shaft, and magnetic poles on opposite sides of the plane of the disk armature, the said armature being provided with spherical surfaces substantially concentric with the center of oscillation of the shaft and the opposed faces of the poles being respectively concave and convex to conform to the faces of the armature.

3. A uni-polar electrical machine comprising a shaft, means through which said shaft is mounted, constructed to permit said shaft to oscillate about a center, an armature carried by the shaft, and a spherical brush-contact surface having its center substantially coincident with the center of oscillation of the shaft.

4. A uni-polar electrical machine comprising a shaft, and a universal-joint bearing for said shaft; a disk armature affixed to said shaft, and magnetic poles adjacent to said armature; the armature and magnetic poles being formed with spherical faces substantially concentric with the universal-joint bearing and with the planes of the segments perpendicular to the shaft, and the universal-joint bearing being located at a point in the shaft remote from the plane of the armature and permitting the armature to oscillate in a direction transverse to the shaft.

5. A uni-polar electrical machine comprising a shaft, a universal-joint bearing through which said shaft is mounted and by which it is permitted to oscillate, a disk armature carried by said shaft, magnetic poles adjacent to the armature and a cone bearing adjustable relatively to the shaft; said armature and magnetic poles being formed with spherical faces concentric with the universal-joint bearing, and their planes perpendicular to the shaft, and said universal-joint bearing and adjustable cone bearing being located at points on the shaft remote from and on opposite sides of the disk armature.

6. A uni-polar electrical machine comprising a shaft, magnetic poles, and a disk armature mounted on the shaft in suitable relation to the magnetic poles; said armature comprising two superposed but insulated disks, of which one is provided with a circumferential extension intersecting the plane of the other and fitting tightly upon the periphery of said other disk to interlock the disks together.

The foregoing specification signed at Leipzig, Germany this 29th day of December, 1906.

WILHELM MATHIESEN.

In presence of—
PAUL HEYCK,
RUDOLPH FRICKE.